H. E. COFFIN.
FILLER FOR TANKS.
APPLICATION FILED AUG. 3, 1912.
1,147,785.
Patented July 27, 1915.
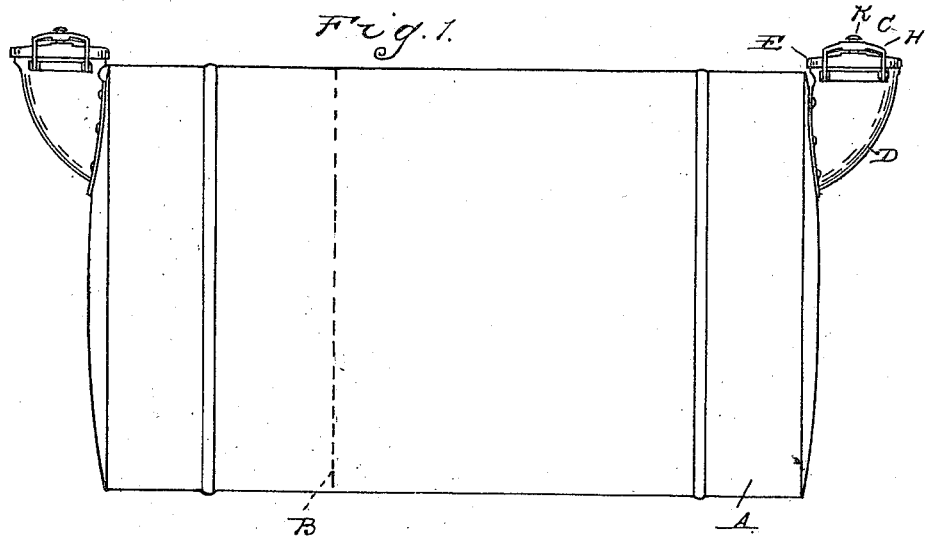
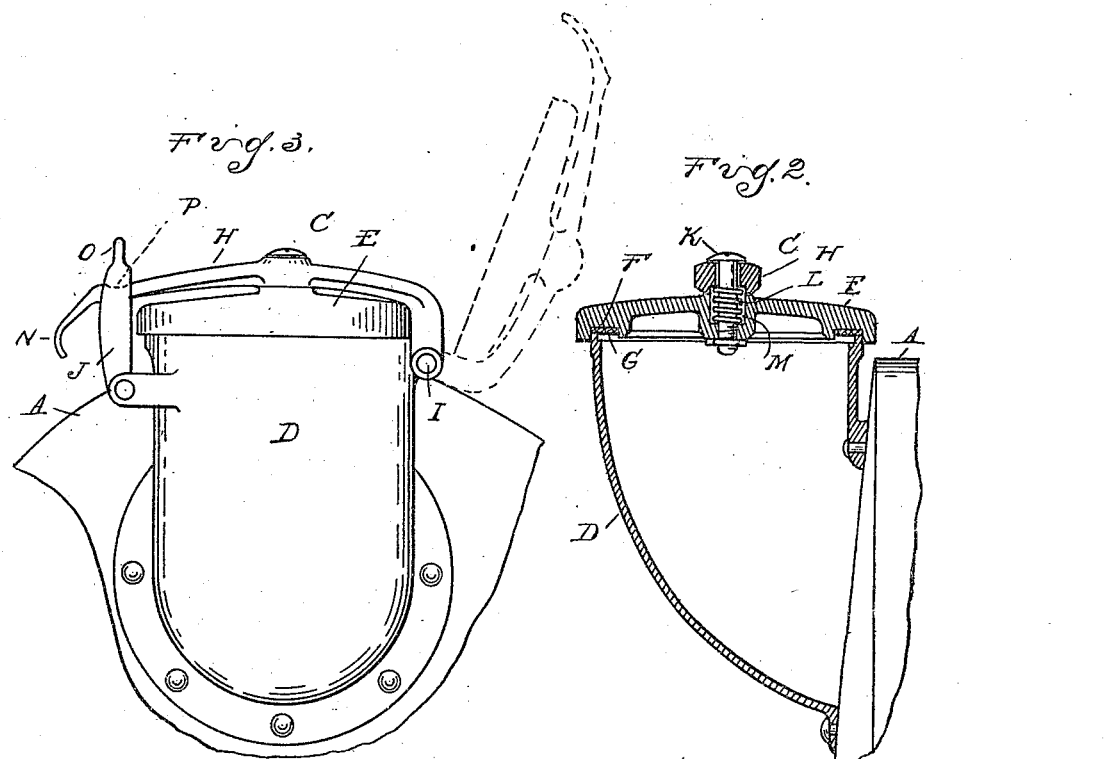

UNITED STATES PATENT OFFICE.

HOWARD E. COFFIN, OF DETROIT, MICHIGAN.

FILLER FOR TANKS.

1,147,785.

Specification of Letters Patent.  Patented July 27, 1915.

Original application filed August 14, 1911, Serial No. 643,865. Divided and this application filed August 3, 1912. Serial No. 713,060.

*To all whom it may concern:*

Be it known that I, HOWARD E. COFFIN, a citizen of the United States of America, residing at Detroit, in the county of Wayne and State of Michigan, have invented certain new and useful Improvements in Fillers for Tanks, of which the following is a specification, reference being had therein to the accompanying drawings.

The invention relates to fill receptacles for tanks, being particularly designed for use on automobiles, and it is the object of the invention to facilitate the filling of the tank. To this end the invention consists; first, in the peculiar arrangement of the filler with respect to the tank; further in the construction of the closure therefor; and further in various features of construction as hereinafter set forth.

In the drawings: Figure 1 is an elevation of a tank to which my improved filler is applied. Fig. 2 is an enlarged section through the filler. Fig. 3 is an end elevation thereof, showing the same in open position.

In the use of automobiles and particularly where time is valuable, as in races, it is desirable to re-fill the fuel tank as expeditiously as possible. Frequently the fill receptacles for said tanks are not conveniently located and furthermore valuable time is lost in detaching the caps and replacing the same. With my improved construction the filler is placed at the end of the tank where it is accessible from the side of the vehicle, while the closure is of a construction permitting of practically instantaneous operation.

As shown, A is the tank mounted in any convenient location on the automobile, so as to extend transversely thereof, with its ends adjacent to the opposite sides of the vehicle. This tank is preferably a double tank, having a partition therein indicated by the dotted line B, so as to form two compartments, one for the fuel-oil, and the other for the lubricating oil.

C are fillers at the opposite ends of the tank for the respective compartments thereof, and which are preferably constructed as follows. D is an elbow fitting secured to the end of the tank in registration with an aperture therein, the opposite end of said elbow being in a horizontal plane and preferably on a level with or slightly above the top of the tank. The closure comprises a cap E which is preferably provided on its under side with an annular groove F in which a suitable packing gasket G is placed and which is adapted to bear against the top edge of the elbow fitting D.

H is a lever to which the cap E is attached and which is hinged at I to the fitting D, and extends over above the cap, into position for engagement with a locking lever J. To form a liquid-tight seal, the cap E is yieldably and resiliently pressed against the fitting D, the yieldable connection being preferably between the cap and the lever. Thus, as shown, K is a pin or bolt for loosely connecting the cap centrally to the lever H, with sufficient universal freedom of movement to permit of perfect seating.

L is a spring sleeved upon the pin K and housed in a recess M in the cap. This spring is of sufficient tension to hold the cap to its seat while yielding to permit of locking the lever H by the locking lever J.

The lever H is provided at its free end with a beveled or cam portion N, with which a laterally extending lug O on the lever J engages, while a slight notch or recess P in the lever H beyond this beveled portion engages with the lug and prevents accidental displacement.

In use whenever it is necessary to re-fill the tank with either fuel or lubricating oil the operator standing at the side of the vehicle, can instantaneously disengage the locking lever J and throw up the lever H and cap E into the position shown in Fig. 3, where the filler is fully opened. The parts will remain in this position until the filling is completed, after which the lever and cap may be thrown down and instantaneously locked, while the yieldable resilient connection and the gasket coöperate to form a liquid-tight seal.

What I claim as my invention is:

The combination with a tank of a filler therefor, comprising a tube or receptacle, a cap for seating on said tube, a hinged lever, clamping means therefor, a pin or link loosely connecting said cap to said lever, and a spring sleeved upon said pin, housed in a recess in said cap between the same and the lever and resiliently holding the cap to its seat.

In testimony whereof I affix my signature in presence of two witnesses.

HOWARD E. COFFIN.

Witnesses:
L. M. CARLE,
C. G. PARK.